No. 721,402. PATENTED FEB. 24, 1903.
J. WALTERS.
ELECTROPLATING APPARATUS.
APPLICATION FILED MAR. 22, 1902.
NO MODEL.
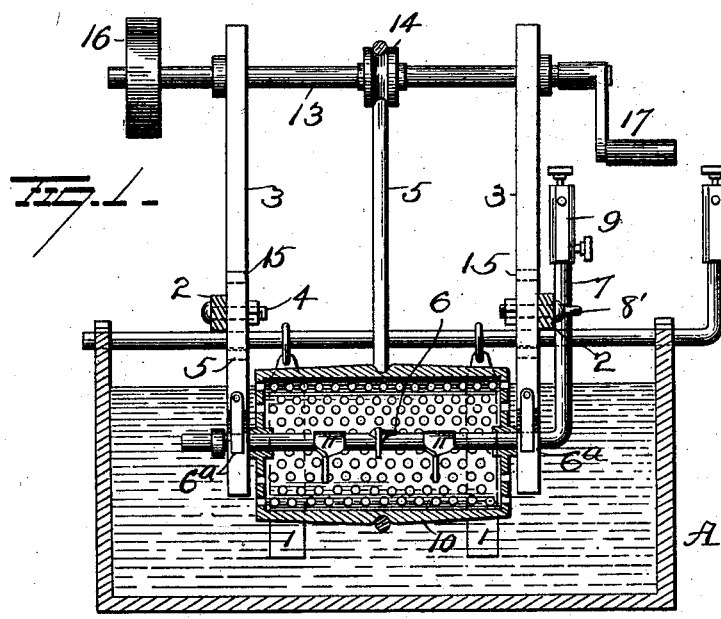
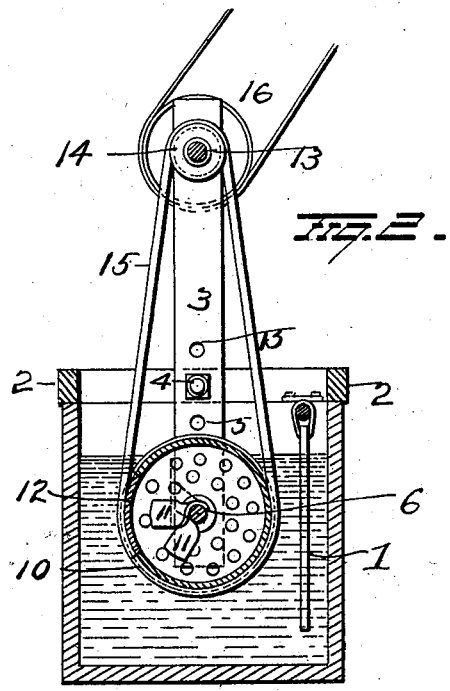
WITNESSES
INVENTOR
Joseph Walters
By H. A. Seymour
Attorney

UNITED STATES PATENT OFFICE.

JOSEPH WALTERS, OF SUMTER, SOUTH CAROLINA.

ELECTROPLATING APPARATUS.

SPECIFICATION forming part of Letters Patent No. 721,402, dated February 24, 1903.

Application filed March 22, 1902. Serial No. 99,483. (No model.)

*To all whom it may concern:*

Be it known that I, JOSEPH WALTERS, a resident of Sumter, in the county of Sumter and State of South Carolina, have invented certain new and useful Improvements in Electroplating Apparatus; and I do hereby declare the following to be a full, clear, and exact description of the invention, such as will enable others skilled in the art to which it appertains to make and use the same.

My invention relates to an improvement in electroplating apparatus, and more particularly to means for cleaning and buffing, as well as plating, the object of the invention being to so construct the apparatus that it can be used interchangeably for preparing articles to be plated and then used for plating them.

A further object is to provide an apparatus for the purpose stated which shall be simple in construction and which shall be readily portable.

A further object is to provide an apparatus for cleaning, electroplating, and buffing which shall be cheap to manufacture, easy to handle, which can be readily adjusted vertically in a plating-bath, and which will operate effectually in the performance of the various functions for which it is intended.

A further object is to so construct the apparatus that it can be used with any tank without necessity for special preparation of the tank itself.

With these objects in view the invention consists in certain novel features of construction and combinations and arrangements of parts, as hereinafter set forth, and pointed out in the claims.

In the accompanying drawings, Figure 1 is a view showing the application of my improvements to a plating-tank. Fig. 2 is a side elevation.

A represents a plating-tank having a suitable electroplating solution therein, and suitable anode-plates 1 are suspended in said solution and connected with the positive terminal of an electric generator.

In constructing my improvements I provide a frame 2, to be placed upon a tank so as to rest upon the tops of the walls thereof and to extend from one wall to another for the purpose of supporting the apparatus over and into the tank. To the respective end bars of frame 2 uprights 3 are adjustably secured by means of screws or pins 4, which pass through said end bars of the frame and into one of a series of holes 5 in the respective uprights. The lower ends of the uprights are provided with bearings $6^a$ for the respective ends of a rod or shaft 6, of metal, (preferably copper,) which constitutes the cathode of the apparatus. This rod or shaft is held stationary, and this may be conveniently accomplished by extending one end of the rod or shaft beyond its bearing and bending it upward to form an arm 7, secured to one end of the frame by means of a suitable fastening device 8'. The free end of the arm 7 is provided with a binding-post 9, with which the negative terminal of the generator is connected. A drum 10, of non-metallic material, (preferably wood,) is mounted to revolve on the rod or shaft 6, and this drum is made with numerous perforations to permit the entrance thereinto of the solution in which it is immersed. The rod or shaft 6 is provided with a series of conducting-arms 11 within the drum, which extend to points in proximity to the drum, and the latter is provided with a suitable door 12 for the admission and withdrawal of articles to be treated.

A shaft 13 is mounted near its ends in the respective uprights 3 at or near the upper ends of the latter, and on said shaft at a point between the uprights 3 a pulley 14 is secured. A driving-belt 15 passes over this pulley and also about the drum 10 for transmitting motion to the latter, and said shaft has secured to its respective ends a pulley 16 and a crank 17.

As is well known, before articles can be electroplated they must be cleaned, both mechanically and chemically. It has been the practive to place the articles in a perforated jar or sink or to string them on wire and carry through a concentrated solution of lye, then cyanid and water or a mixture of suitable acids, as the case may be, and when the articles have become clean they have been transferred to a plating-barrel attached to the plating-tank. In practice it has been found that in carrying out the various processes of cleaning the articles have been imperfectly cleaned and scratched. It affects their finish, because they were permitted to lie one upon another and by manipulating them by hand they would become seriously scratched. With my apparatus the articles can be placed in the perforated drum, the apparatus set over a lye-kettle, and then by turning the crank 17 the articles will be made to roll over each other and become perfectly clean. As the rotating of objects under water or solution prevents them from becoming scratched, the apparatus can then be removed to a washing-tank and the articles can be washed in the same manner. After the articles shall have been perfectly cleaned the apparatus, with the articles still contained within the perforated drum, will be placed upon the plating-tank and the standards so adjusted that the drum can be lowered nearly to the bottom of the tank where the solution is thickest, or said standards may be adjusted to permit the drum to be lowered or raised only a limited distance into the solution, as the circumstances in a particular case may require. When the apparatus shall have been properly placed in position on the plating-tank, a belt from any suitable or convenient source of power will be placed on the pulley 16 and the drum containing the articles will be made to rotate in the plating solution where they will not only become perfectly plated, but one article rubbing against another they will be burnished or polished to such an extent as to avoid the necessity of much of the subsequent finishing heretofore found necessary.

Slight changes might be made in the details of construction of my invention without departing from the spirit thereof or limiting its scope. Hence I do not wish to limit myself to the precise details therein set forth.

Having fully described my invention, what I claim as new, and desire to secure by Letters Patent, is—

1. In a cleaning, plating and burnishing apparatus, the combination with a horizontal portable frame constructed to be removably placed upon and temporarily supported by a tank, of depending standards, attached between their ends to said frame, a perforated drum mounted between said standards, a metal rod in said drum and means carried by the standards for rotating the drum.

2. In a cleaning, plating and burnishing apparatus, the combination with a horizontal portable frame constructed to be removably placed upon and supported by a tank, of standards attached to and depending from said frame, a perforated drum mounted in the lower end of said standards, a metal rod in said drum, a shaft mounted in the upper end of said standards, means for transmitting motion from said shaft to the drum, a pulley on one end of the shaft and a crank secured to the other end of the shaft.

3. The combination with a horizontal portable frame constructed to rest upon and be removed from a tank, of standards secured to said horizontal frame and extending above and below the same, a metal rod attached to the lower end of the standards, a perforated drum mounted to rotate on said rod, and a shaft mounted in the standards and means for transmitting motion from said shaft to the drum.

4. The combination with a horizontal portable frame constructed to rest upon and be removable from a tank, and standards secured to said horizontal frame, of a single metal rod attached to the lower ends of the standards, a perforated drum inclosing said rod, conducting-fingers on the rod within the drum, a shaft mounted in and carried by the upper ends of the standards, a pulley on said shaft, a belt passing over said pulley and means for rotating the shaft.

5. The combination with a horizontal portable frame constructed to rest upon and be removable from a tank, of standards carried by said frame, a perforated drum carried at the lower ends of said standards, a cathode-rod in the drum and on which the drum is mounted, fingers on said cathode-rod, means carried by the standards for rotating the drum, and means for adjusting the standards vertically with relation to the frame to cause the drum to depend different distances into the fluid in the tank.

In testimony whereof I have signed this specification in the presence of two subscribing witnesses.

JOSEPH WALTERS.

Witnesses:
B. FRANK KELLEY,
H. T. EDENS.